Sept. 19, 1972  K. P. GLADNEY ET AL  3,692,507
PRODUCTION OF ALKALI METAL SILICATE FIBERS Filed Dec. 29, 1969  2 Sheets-Sheet 1

INVENTORS
KURT P. GLADNEY,
RAMESH P. RAO

BY
*Stevens, Davis, Miller & Mosher*
ATTORNEYS

United States Patent Office 3,692,507
Patented Sept. 19, 1972

3,692,507
PRODUCTION OF ALKALI METAL
SILICATE FIBERS
Kurt P. Gladney and Ramesh P. Rao, Sarnia, Ontario,
Canada, assignors to Fiberglas Canada Limited,
Toronto, Ontario, Canada
Filed Dec. 29, 1969, Ser. No. 888,989
Int. Cl. C03b
U.S. Cl. 65—2                                    12 Claims

ABSTRACT OF THE DISCLOSURE

Foamable fibers of alkali metal silicate glass are prepared by dispersing flowing fine streams of molten glass to centrifugation or to a high velocity blast of gas thereby forming fibers of random length and average diameters in the range 0.1 to 1.0 mil, and hydrating the resulting staple fibers to a moisture content of 5 to 40% by treatment with steam or a water spray. If desired, fiberizing may be effected by centrifugally dispersing the molten streams in a first step and then subjecting the dispersed streams to the high velocity gas blast. The gas is preferably superheated steam, hot compressed air or a fuel gas flame. The thus-hydrated product may be foamed by conventional foaming techniques.

CROSS REFERENCE TO RELATED APPLICATIONS

This application is related to a copending U.S. application Ser. No. 875,568 filed on Nov. 10, 1969 by R. P. Rao, and entitled "Process for Making Silicate Foams From Alkali Metal Silicates."

This application relates to a process for the manufacture of inorganic foam materials from alkali metal silicates. It is directed primarily to the manufacture of insulating materials of low bulk density, of good physical properties, and of moisture resistance commensurate with the end uses.

In particular, it is concerned with the economical and technically efficient manufacture of such foamed or foamable silicates directly from the glasses as molten from their raw materials. It appears that it is technically and economically advantageous to convert such foamable silicate glasses directly from the molten state under controlled conditions into fibers or other particulate form of a well defined fiber diameter, size or range of sizes, prior to or almost simultaneously with the step of hydration and prior to any other subsequent steps required to manufacture foams.

Alkali metal silicates, as represented for example by sodium silicates, of a range of molar ratios of silica ($SiO_2$) to soda ($Na_2O$) are manufactured in bulk for many industrial applications. For more detailed background information one might refer to "Soluble Silicates" by James G. Vail, American Monograph Series #116.

Silicates of the alkali metals, mainly sodium and potassium but also lithium, caesium, and rubidium, may be produced by blending high grade silica (quartz) sand or silica flour with such alkali metal compounds as the carbonates, sulfates, or hydroxides in predetermined proportions, and melting the mixture of raw materials in conventional glass melting furnaces at temperatures of 1400 to 1600° C. until a clear homogeneous glass is formed. On cooling, the molten alkali silicate glass solidifies and can be ground to a desired particle size. For many purposes, however, the alkali silicates are required in the form of aqueous solutions of specified composition (mole ratio of $SiO_2$ to $Na_2O$), solids content and viscosity. Therefore, it is common practice to quench the molten silicate glasses in water, thus utilizing their heat towards preparation of the aqueous solutions.

An alternate process for the manufacture of sodium or potassium silicates is to dissolve silica of fine particle size (e.g. a diatomaceous earth) in concentrated alkali metal hydroxide.

It is known that such aqueous solutions of certain alkali metal silicates will upon removal by evaporation of most of the water form viscous foamable residues which upon continued rapid heating expand to many times their original volume and finally solidify into cellular foams.

The related copending application referred to above shows that foamable compositions and foams of desirable properties can be advantageously prepared by controlled hydration of solid alkali metal silicate particles or of mixtures of solid alkali metal silicate particles with particles or solutions of insolubilizing compounds, complexing compounds and fillers.

Inorganic foams or foam aggregates have commercially attractive properties for many end uses, for example, as incombustible and heat and sound insulation and structural materials. For some of these applications, inorganic foams made of unmodified alkali metal silicates are useful, despite their very poor water resistance. For other purposes, more stringent requirements have to be met as regards such physical and chemical properties as moisture resistance, vapour permeability, insolubility, compressive strength, low thermal conductivity, and thermal resistivity.

There exists an extensive body of prior art concerning the use of alkali metal silicates in the form of foams, and as inorganic bonding agents for other materials of low density and desirable insulating and structural properties. The prior art also discloses additives and other means for imparting to such expanded materials a high degree of insolubility, compressive strength, thermal stability, or other desired property. The additives most frequently used or suggested can be referred to as complexing and condensation agents which impart a greater degree of stability to the molecular structure of the silicates. Some of these additives and fillers further affect the shape and size of the cell structure, by varying the characteristics such as viscosity, elasticity and surface tension, of the hydrate while being foamed. The process of insolubilization will benefit from uniform distribution of the additives within the foamable matrix of the alkali metal silicate fibers or particles which is attainable by the use of the present method.

Fibers of alkali metal silicate glass form the subject of U.S. Pat. No. 3,239,369 by H. I. Glaser and entitled "Sodium Silicate Fibers." The method described therein is industrially used and uniquely suited to the production at relatively low output rates of a multitude of parallel and continuous glass filaments of closely controlled uniform diameter. These are combined and further processed into textile and reinforcing yarns.

In the case of this prior Glaser patent, though, the objective is a continuous filament from which the alkali can be removed subsequently by acid leaching without affecting the integrity of the resulting continuous alkali free silica filament. It will be noted that in order to do so, the fiber forming process is essentially dry and hydration of the filament is inhibited during and after the forming process, by means of a coating.

The Glaser patent discloses the use of a textile bushing device with multiple orifices to prepare multiple individual continuous filaments of alkali metal silicates. In our work we have found a similar device with a single orifice to be very useful to prepare silicate fibers and to collect them in the form of parallel strands or random mats. In view of the specific objectives (the production of a continuous filament of silica) the Glaser patent refers to the use of only one of several basic processes known to those familiar with the technology of forming comminuted glass.

In contrast, the present process can take advantage of known features of any of the other basic methods for producing fibrous, filamentary or particulate products. For example we may refer to methods of:

(1) Forming continuous filaments,
(2) Forming continuous primary filaments and attenuating (fiberizing) these by the kinetic energy of a high pressure fuel- air blast flame,
(3) Fiberizing fluid glass streams using the kinetic energy of compressed air or of superheated steam,
(4) Fiberizing fluid glass streams by centrifugal means together with attenuation by the kinetic energy of a high pressure fuel-air flame, air or steam.

The present invention therefore provides a method of preparing foamable particles of alkali metal silicate which comprises preparing a molten alkali metal silicate glass, comminuting the molten silicate glass and applying additives to the particles and collecting the particles. The additives may comprise water of hydration. The hydrated treated particles may be foamed after formation, or stored for a length of time.

The present invention further provides a method of preparing foamable fibers of alkali metal silicate which comprises preparing a molten alkali metal silicate glass, fiberizing the molten alkali metal silicate glass, and hydrating and collecting the silicate glass fibers.

The alkali metal silicate may preferably be a sodium or potassium silicate glass having a ratio of silica ($SiO_2$) to alkali metal oxide ($M_2O$) of 1:1 to 5:1. Particularly preferred is such a method wherein sodium silicate is employed having a ratio of $SiO_2:Na_2O$ of 3:1 to 4:1.

The hydration will be carried out on the comminuted silicate to the level of hydration desired usually within the range of 5 to 40% water, preferably 5 to 30%.

Suitable additives used in silicate glass may of course be presented in the molten glass. This refers, for example, to glass forming oxides, such as metal oxides.

In accordance with one method of forming silicate fibers a stream of molten silicate glass is formed into coarse fibers by a centrifugation step, said fibers being attenuated into fine random staple fibers by high velocity fuel-air flame. In accordance with another method a stream of molten silicate glass is attenuated into random staple fibers by a high velocity blast of hot compressed air, superheated steam, or a fuel-air flame. The diameter of the alkali metal silicate fibers will preferably be in the range of from 0.1 to 1.0 mil (0.0001 to 0.01 inch) and most preferably within the range of from 0.25 to 0.6 mil.

The silicate glass particles or fibers have a high specific surface area and may be treated while forming or immediately after forming with additives such as hydrating steam, vapours, aqueous solutions, dispersions, particulate sprays, or dry particulate powders of insolubilizing agents, complexing agents, and mineral or organic fillers.

The random particles of fibers may be collected by any suitable means such as by suction on a foraminous conveyor whereby to separate gaseous and vapour byproducts, and collect the product into a uniform mass, such as a fibrous mat or felt, of controllable thickness, weight, density and chemical composition. The hydrating steam and/or other additives may advantageously be applied to the particulate mass on the conveyor, or as part of the fiberizing gaseous blast.

The present invention further provides in another aspect a method of preparing shaped articles of foamed alkali metal silicate comprising the steps of preparing a molten alkali metal silicate glass, fiberizing the molten alkali metal silicate glass, steam hydrating and collecting the silicate glass fibers in a random mat and foaming the hydrated alkali metal silicate fiber mat by application of heat energy.

By another aspect the present invention provides hydrated alkali metal silicate particles, such as fibers, having a diameter in the range of 0.1 to 10 mils. The present invention further provides a random mat formed of a mass of hydrated alkali metal silicate formed from staple fibers having a diameter in the range of 0.1 to 1.0 mils.

In the schematic drawings which accompany this application:

Figure 1:
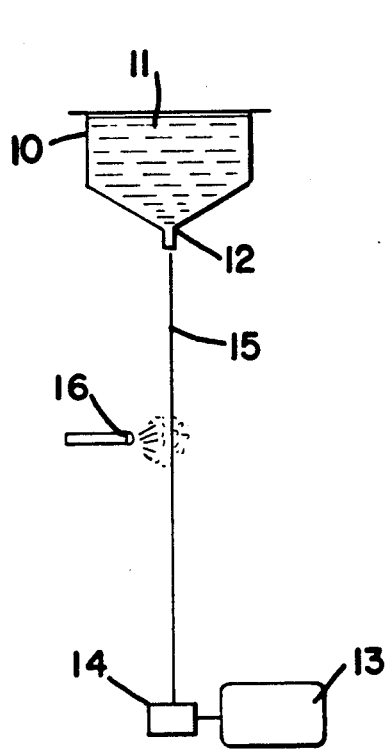
FIG. 1 shows the production of a monofilament of silicate glass.

Referring now to the drawings, FIG. 1 represents the basic arrangement of a platinum vessel 10 containing a supply of molten silicate glass 11, a calibrated orifice bushing 12, a variable speed motor 13, carrying a removable collet 14, upon which the continuous filament 15 of glass can be wound. The vessel 10 and orifice bushing 12 are electrically heated to maintain the glass at a closely controlled temperature. Glass viscosity at the selected temperature in conjunction with the orifice size and with the circumferential speed of collet 14 determine the thickness of the filament and the quantity of glass filamentized. The product is a continuous filament of glass.

The basic unit as per FIG. 1 may be modified by the addition of a spray device 16 for applying an additive to the glass filament 15. Such additives may comprise gases, saturated or superheated steam, or finely distributed dispersions or suspensions of liquid or solid particles in a gaseous carrier. The basic unit as per FIG. 1 can similarly be modified by addition of a pad or roller coating device for coating the glass filament with a liquid additive.

Figure 2:
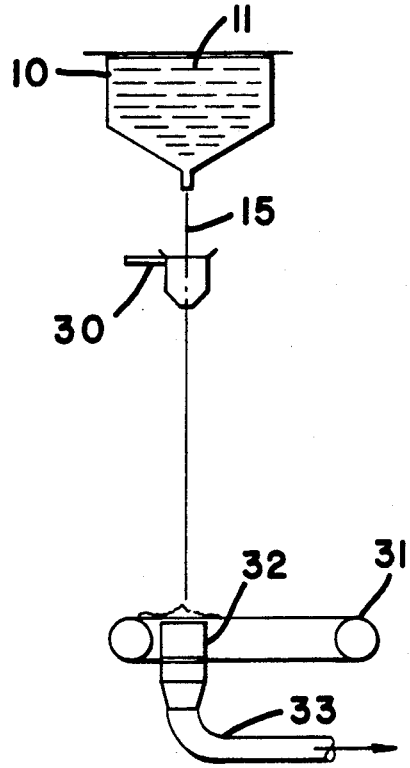
FIGS. 2, 3 and 4 show various means of producing random silicate fiber masses.

FIG. 2 shows the winder motor 13 and collet 14 replaced by a venturi type ejector means 30 for applying tension to the continuous glass filament 15 and a collecting means for collecting the filament in the form of a random mass or mat. FIG. 2 shows a moveable endless wire mesh screen 31 passing over a suction chamber 32 which is vented through a conventional venting and exhausting means 33 at a rate suited to separate the filament from any undesired gaseous byproducts of the process and to collect it in a more or less compacted random mass.

The apparatus shown in FIG. 2 may similarly be combined with coating a spray pad or roller devices similar to those in FIG. 1. In particular, it is possible to envisage the ejector device 30 as one of the means for applying gaseous vapours or aerosols.

Figure 3:
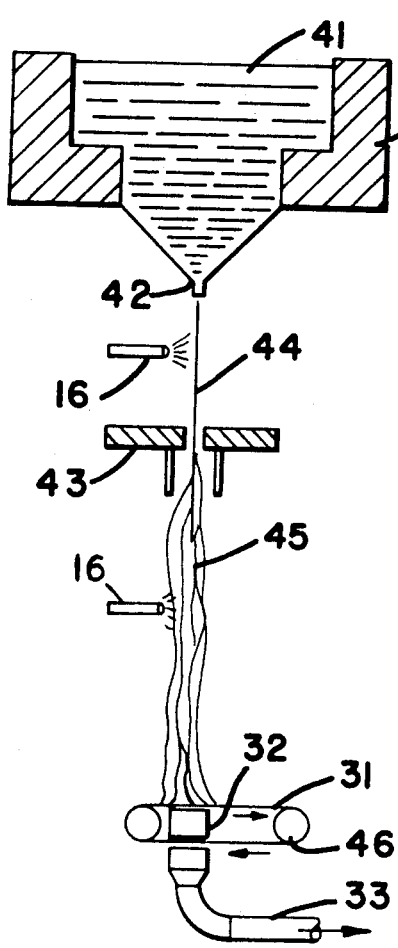

FIG. 3 represents in schematic fashion a feasible process for manufacturing fibers of random length and of diameters ranging around a controllable average diameter. Such fibers will hereafter be referred to interchangeably as "staple fibers" or "wool fibers." In FIG. 3, the source of molten glass is an extension of a glass melting furnace 40, built of refractory blocks, and containing molten glass 41 maintained at a constant level. Multiple streams of liquid glass 44 issue from multiple orifice bushings 42 and are fiberized into discontinuous staple fibers 45 by a downwardly directed blower device 43 employing superheated steam. The fibers 45 are collected upon a foraminous conveyor 31 while gaseous products and vapours are removed through an exhaust box 32 and exhaust system 33. A spray unit 16 for applying liquid bonding or other materials to the fibers can be arranged anywhere between the blower 43 and the delivery end 46 of the conveyor 31. Similarly spray means 16 can be provided to apply vapours or aerosols to the glass streams before fiberization.

Figure 4:
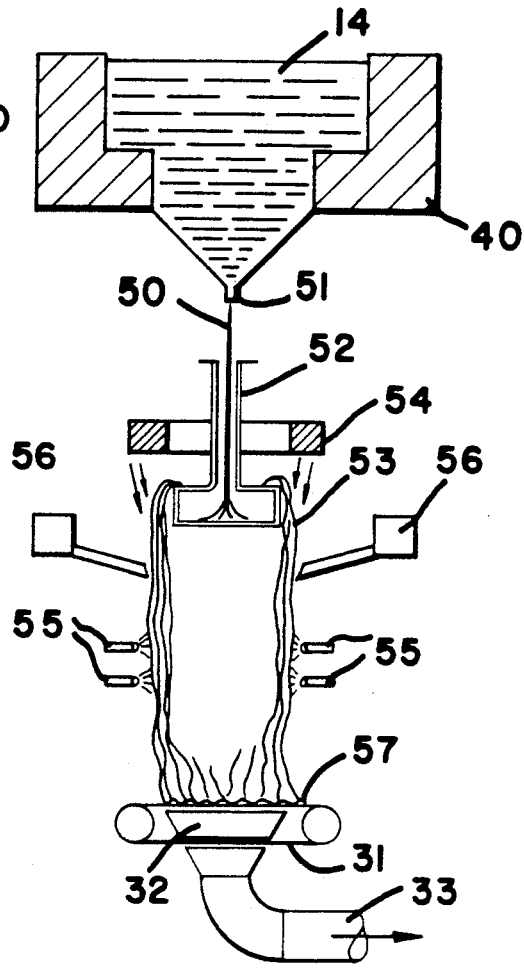

FIG. 4 is a highly schematic representation of a modern proprietory centrifugal process. A stream of molten glass 50 issuing from an electrically heated bushing 51 is centrifugally dispersed by a perforated spinning device 52 rotating at high speed. The primary fibers 53 are further elongated and attenuated by the kinetic energy of a high pressure gas blast supplied by burners and/or steam vents 54. Sprays 55 permit treatment of the mass of freshly formed glass fibers with other materials before they are deposited on the foraminous conveyor 31. Similarly, a device 56 permits controlled addition of powdered minerals or the like to the mass of fibers for uniform distribution throughout the mat or felt 57 collected on conveyor 31.

For the initial preparation of experimental quantities of sodium silicate fibers of controlled composition and fiber diameter, a single hole bushing apparatus was used as schematically illustrated in FIG. 1. It consists of an electrically heated platinum vessel with a single orifice, of 0.038" diameter in its bottom, and of a variable speed winder with a removable collet.

A series of tests were carried out as follows. 30 grams of solid sodium silicate glass (composition 3.22 mol $SiO_2$:1 mol $Na_2O$) was placed into the platinum container 10 at 1200° C. to remelt the glass, to remove gaseous inclusions, and to establish the controlled conditions of temperature and viscosity required for fiberizing (spinning). When this was achieved, the filament 15 was started and attached to the collet 13 of the winder rotating at a speed preset to result in the desired filament diameter. The winder speed was then adjusted to a constant filament diameter of 0.5 mil, and winding continued until about 10 grams of fiber samples had been collected. The sample skein was then cut off the collet, cut into short lengths and transferred to a closed container.

In one group of tests a few grams of the silicate fibers while fresh were placed in a microwave oven for rapid heating under conditions found useful for converting sodium silicate hydrates into foams. The fibers in this group remained unchanged, indicating full transparency to microwaves due to their anhydrous nature.

In another group of tests a few grams of the sample specimen were placed in an autoclave, and treated with saturated steam at 5 p.s.i. pressure (227° F.) for 10 minutes. The sample was found to have become deliquescent, hence essentially useless for the intended purpose.

A third group of samples were placed in the autoclave at similar pressures and temperatures for periods ranging from 2 to 6 minutes. When removed from the autoclave, this group of samples had retained their fibrous configuration to some extent. The hydrated mats so produced were found to be stable on storage, either in a normal atmosphere or preferably in an atmosphere of controlled humidity. For extended storage it was found to be preferable to enclose the material, such as in a plastic bag.

After various period of storage ranging from one day to three months, the masses were placed in a microwave oven for heating, as described above. The fibrous samples intumesced upon application of microwave energy, losing the fibrous configuration and forming a more or less coherent foamy mass of low density and low integrity.

In another series of tests random fibers produced by methods shown in FIGS. 3 and 4 were found to perform similarly.

The present invention provides a technique for the commercial production of foamable materials and of foams from alkali metal silicate compositions. By providing for the application of water of hydration and other additives to the particles of silicate at a time when the particles are being formed, the present invention provides a mass of uniformly hydrated and treated particles highly suitable for foaming.

More or less detailed claims will be presented hereinafter. Those skilled in the technologies of glass fibers, of foamable alkali metal silicates and of chemically stabilized silicate foams will recognize that there are obvious equivalents for specific equipment or materials recited in the claims. Some of the obvious equivalents will readily occur to one skilled in one or the other technology, and still other obvious equivalents could be readily arrived at by rather simple non-inventive experimentation.

The present invention provides a technique for the

We claim:

1. A method for producing foamed alkali metal silicate glass comprising preparing a body of molten alkali metal silicate glass, drawing at least one fluid glass stream from said body, fiberizing said fluid glass stream, (a) by centrifugation of said stream or (b) by subjecting said stream to a high velocity blast of gas, contacting the resulting glass fibers with steam or a water spray thereby hydrating said fibers to a moisture content of 5 to 40%, collecting the hydrated alkali metal silicate glass fibers and heating to a temperature sufficient to foam the product.

2. A method as set forth in claim 1 wherein the gas is fuel gas flame.

3. A method as in claim 1 wherein the molten alkali metal silicate is a sodium or potassium silicate glass having a ratio of silica ($SiO_2$) to alkali metal oxide ($M_2O$) of 1:1 to 5:1.

4. A method as in claim 3 wherein the alkali metal silicate is a sodium silicate of a composition having a ratio of $SiO_2$:$Na_2O$ of 3:1 to 4:1.

5. A method as in claim 1 wherein the alkali metal silicate glass composition further comprises other glass forming oxides.

6. The method of claim 1 wherein the average diameters of the alkali metal silicate fibers are within the range of from 0.1 to 1.0 mil.

7. The method of claim 6 wherein the average diameters of the alkali metal silicate fibers fall into the range of from 0.25 to 0.6 mil.

8. A method as set forth in claim 1 wherein the glass is fiberized as one or more continuous filaments.

9. A method as set forth in claim 1 wherein the fluid glass stream is fiberized by a centrifugation step into coarse fibers and the coarse fibers are attenuated into fine random fibers by contact with a high velocity fuel gas flame.

10. A method as set forth in claim 1 wherein an additive from the group consisting of insolubilizing agents, complexing agents and fillers is applied to the fibers.

11. A method as in claim 9 wherein the random fibers are collected by suction on a foraminous conveyor whereby to separate gaseous and vapour byproducts and collect the fibrous product into a uniform fibrous mat or felt of controllable thickness, weight and density.

12. A method is in claim 11 wherein hydrating steam is applied to the fibrous mat on the conveyor.

References Cited

UNITED STATES PATENTS

| | | | |
|---|---|---|---|
| 3,396,112 | 8/1968 | Burrows et al. | 106—75 X |
| 3,347,648 | 10/1967 | Krakauber et al. | 65—3 |
| 3,389,446 | 6/1968 | Parrish | 65—22 UX |
| 3,498,770 | 3/1970 | Phillips et al. | 65—3 |
| 3,239,369 | 3/1966 | Glaser | 117—126 GQ |

FOREIGN PATENTS

| | | |
|---|---|---|
| 426,246 | 3/1945 | Canada. |

ROBERT L. LINDSAY, JR., Primary Examiner

U.S. Cl. X.R.

65—3, 22; 106—75

UNITED STATES PATENT OFFICE
CERTIFICATE OF CORRECTION

Patent No. 3,692,507          Dated September 19, 1972

Inventor(s) Kurt P. Gladney et al.

It is certified that error appears in the above-identified patent and that said Letters Patent are hereby corrected as shown below:

Column 1, line 14, delete "dispersing" and insert -- exposing --

Column 3, line 36, "presented" should read -- present --;

line 41, after "by" insert -- a --;

line 47, "0.01" should read -- 0.001 --;

line 75, "10" should read -- 1.0 --.

Column 6, line 5, delete "The present invention provides a technique for the".

Signed and sealed this 30th day of April 1974.

(SEAL)
Attest:

EDWARD M. FLETCHER, JR.         C. MARSHALL DANN
Attesting Officer               Commissioner of Patents